US012537588B2

(12) United States Patent
Ren et al.

(10) Patent No.: US 12,537,588 B2
(45) Date of Patent: Jan. 27, 2026

(54) PRECODER SELECTION FOR MINIMIZING IMPACT OF CYCLIC SHIFT PORT VIRTUALIZATION ON COMMUNICATION PERFORMANCE IN JOINT COMMUNICATION AND SENSING (71) Applicant: MEDIATEK INC., Hsinchu (TW)

(72) Inventors: Jiaying Ren, San Jose, CA (US); Shiauhe Tsai, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/828,028

(22) Filed: Sep. 9, 2024

(65) Prior Publication Data

US 2025/0096881 A1    Mar. 20, 2025

Related U.S. Application Data (60) Provisional application No. 63/582,550, filed on Sep. 14, 2023.

(51) Int. Cl.
*H04B 7/08* (2006.01)
*H04L 5/00* (2006.01)

(52) U.S. Cl.
CPC ......... *H04B 7/0848* (2013.01); *H04L 5/0007* (2013.01); *H04L 5/0048* (2013.01)

(58) Field of Classification Search
CPC .... H04B 7/0848; H04L 5/0007; H04L 5/0048
See application file for complete search history.

(56) References Cited

U.S. PATENT DOCUMENTS

2017/0276770 A1\* 9/2017 Lin .................... H01Q 3/24
2021/0286045 A1\* 9/2021 Bayesteh ............ H04B 7/0695

\* cited by examiner

*Primary Examiner* — Sung S Ahn
(74) *Attorney, Agent, or Firm* — McClure, Qualey & Rodack, LLP (57) ABSTRACT

A method of joint communication and sensing of a target obstacle includes deploying an integrated sensing and communication (ISAC) node having an ISAC transmitter having M transmitting antenna(s) and a radar receiver having L receiving antenna(s), wherein the M and L are integers; transmitting radio frequency (RF) signals carrying data to a communication receiver by the M transmitting antenna(s) of the ISAC transmitter; receiving radio frequency (RF) signals reflected by the target obstacle by the L receiving antenna(s); and obtaining a sounding result based on the reflected radio frequency (RF) signals; wherein the RF signals are applied with cyclic shift diversity; and wherein the RF signals contain precoders which are selected by aligning a range of communication direction linked to a communication channel between the ISAC node and the communication receiver with minimal capacity loss based on the sounding result.

20 Claims, 9 Drawing Sheets

PRECODER SELECTION FOR MINIMIZING IMPACT OF CYCLIC SHIFT PORT VIRTUALIZATION ON COMMUNICATION PERFORMANCE IN JOINT COMMUNICATION AND SENSING

BACKGROUND OF THE INVENTION

1. Field of the Invention

This disclosure generally relates to joint communications and sensing, and more particularly, to a method in association with precoder selection for minimizing the impact of cyclic shift port virtualization on communication performance in joint communication and sensing.

2. Description of Related Art

In a typical mobile communication environment, a User Equipment (UE) (also called as a Mobile Station (MS)), such as a mobile phone (also known as a cellular phone or cell phone), a tablet Personal Computer (PC), or a vehicle with wireless communication capability may communicate voice and/or data signals with a wireless communication network. The wireless communication between the UE and the wireless communication network may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and New Radio (NR) technology etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

However, if the sensing process for target obstacles (objects or humans) were to be performed standalone and provided with a specific type of 5G NR waveform for sensing purpose only, it can cause poor performance for communication with cyclic shift port virtualization that aiming at enhancing sensing performance. Therefore, it is desired to have a precoder design for minimizing the impact of cyclic shift port virtualization on communication performance in joint communication and sensing.

SUMMARY OF THE INVENTION

In one aspect of the present disclosure, a method of joint communication and sensing of a target obstacle (object or human) is disclosed. The method comprises deploying an integrated sensing and communication (ISAC) node, comprising an ISAC transmitter having M transmitting antenna(s) and a radar receiver having L receiving antenna(s), wherein the M and L are integers; transmitting radio frequency (RF) signals carrying data to a communication receiver by the M transmitting antenna(s) of the ISAC transmitter; receiving radio frequency (RF) signals reflected by the target obstacle by the L receiving antenna(s); obtaining a sensing result based on the reflected radio frequency (RF) signals; and determining a sounding result based on a reference signal sent by the communication receiver; wherein the RF signals transmitted by the M transmitting antenna(s) of the ISAC transmitter are applied with cyclic shift diversity; and wherein the RF signals transmitted by the M transmitting antenna(s) of the ISAC transmitter contain precoders which are selected by aligning a range of communication direction linked to a communication channel between the ISAC node and the communication receiver with minimal capacity loss based on the sounding result.

In another aspect of the present disclosure, the radio frequency (RF) signals transmitted by the M transmitting antenna(s) of the ISAC transmitter are cyclic shifted in time domain.

In yet another aspect of the present disclosure, a virtual receiving array is generated by the M transmitting antenna(s) and the L receiving antenna(s).

In yet another aspect of the present disclosure, the radio frequency (RF) signals transmitted by the M transmitting antenna(s) of the ISAC transmitter are orthogonal frequency domain multiplexing (OFDM) signals.

In yet another aspect of the present disclosure, the radio frequency (RF) signals transmitted by the M transmitting antenna(s) of the ISAC transmitter form virtually orthogonal transmitter ports that are distinguishable at each of the L receiving antenna(s).

In yet another aspect of the present disclosure, the reference signal is an uplink reference signal.

In yet another aspect of the present disclosure, the uplink reference signal is a sounding reference signal (SRS) or a demodulation reference signal (DMRS).

In another aspect of the present disclosure, the precoders are selected to cause a frequency-domain flatness at an Angle of Departure (AoD), which is the ratio of a minimum value to the maximum value of the communication channel frequency domain response per resource element at the range of communication direction, to be close to 1.

In another aspect of the present disclosure, a joint communication and sensing of a target obstacle (object or human) is disclosed. The method comprises deploying an integrated sensing and communication (ISAC) node, comprising an ISAC transmitter having M transmitting antenna(s) and a radar receiver having L receiving antenna(s), wherein the M and L are integers; transmitting radio frequency (RF) signals carrying data to a communication receiver by the M transmitting antenna(s) of the ISAC transmitter; receiving radio frequency (RF) signals reflected by the target obstacle by the L receiving antenna(s); obtaining a sensing result based on the reflected radio frequency (RF) signals; and obtaining a transmit precoder matrix indicator (TPMI) index based on a feedback signal sent by the communication receiver; wherein the RF signals transmitted by the M transmitting antenna(s) of the ISAC transmitter are applied with cyclic shift diversity; and wherein the RF signals transmitted by the M transmitting antenna(s) of the ISAC transmitter contain precoders which are selected by aligning one or more communication direction(s) linked to a communication channel between the ISAC node and the communication receiver with minimal capacity loss based on the TPMI index.

In another aspect of the present disclosure, the radio frequency (RF) signals transmitted by the M transmitting antenna(s) of the ISAC transmitter are cyclic shifted in time domain.

In another aspect of the present disclosure, the precoders are selected to generate one or more mainlobe(s) of an Angle of Departure (AoD) whose direction(s) aligns with that corresponding to the minimum capacity loss at the communication receiver.

In another aspect of the present disclosure, the radio frequency (RF) signals are orthogonal frequency domain multiplexing (OFDM) signals.

In another aspect of the present disclosure, an integrated sensing and communication (ISAC) node is disclosed. The ISAC node comprises an ISAC transmitter having M transmitting antenna(s) for transmitting radio frequency (RF) signals carrying data to a communication receiver; and a radar receiver having L receiving antenna(s) for receiving radio frequency (RF) signals reflected by a target obstacle; wherein the M and L are integers; and wherein the ISAC node estimates a channel condition of a communication channel between the ISAC node and the communication receiver; and wherein the RF signals transmitted by the M transmitting antenna(s) are applied with cyclic shift diversity and contain precoders which are selected by aligning a range of communication direction linked to the communication channel between the ISAC node and the communication receiver with minimal capacity loss based on the estimated channel condition.

In another aspect of the present disclosure, the radio frequency (RF) signals are cyclic shifted in time domain.

In another aspect of the present disclosure, a virtual receiving array is generated by the M transmitting antenna(s) and the N receiving antenna(s).

In another aspect of the present disclosure, the radio frequency (RF) signals transmitted by the M transmitting antenna(s) are orthogonal frequency domain multiplexing (OFDM) signals.

In another aspect of the present disclosure, the radio frequency (RF) signals transmitted by the M transmitting antenna(s) form virtually orthogonal transmitter ports that are distinguishable at each of the N receiving antenna(s).

In another aspect of the present disclosure, the channel condition of the communication channel between the ISAC node and the communication receiver is estimated based on a sounding reference signal (SRS) or a demodulation reference signal (DMRS) sent by the communication receiver.

In yet another aspect of the present disclosure, the channel condition of the communication channel between the ISAC node and the communication receiver is estimated based on a feedback signal containing a TPMI index sent by the communication receiver.

In another aspect of the present disclosure, the precoders are selected to cause a frequency-domain flatness at an Angle of Departure (AoD), which is the ratio of a minimum value to the maximum value of the communication channel frequency domain response per resource element at the range of communication direction, to be close to 1.

These and other features and advantages of the present disclosure can be more readily understood from the following preferred embodiments with reference to the appended drawings.

BRIEF DESCRIPTION OF THE DRAWINGS

In order to sufficiently understand the essence, advantages and the preferred embodiments, the following detailed description will be more clearly understood by referring to the accompanying drawings.

DETAILED DESCRIPTION OF THE DRAWINGS

The following description discloses the preferred embodiments. The present disclosure is described below by referring to the embodiments and the figures. Thus, the present disclosure is not intended to be limited to the embodiments shown, but is to be accorded the principles disclosed herein. Furthermore, that various modifications or changes in light thereof will be suggested to a person having ordinary skill in the art and are to be included within the spirit and purview of this application and scope of the appended claims.

First of all, sensing surrounding target obstacles (objects or humans) through signal delay measurement and Doppler shift detection is commonly known and used in radar engineering. In a radar sensing system, it usually transmits several radio waves by transmitters and then receives reflected radio waves by receivers to determine one or more characteristics of the surrounding target obstacles, such as distances, azimuth angles, elevation angles, and/or velocities of the target obstacles.

The transmitters and receivers in the radar system may or may not be co-located. If transmitters and receivers are located at the same location, it is known as a monostatic sensing system. If transmitters and receivers are located at different locations, it is known as bistatic sensing system.

In 5G NR, MIMO (Multiple Input Multiple Output) technology deploys multiple antennas at both the transmitter and receiver (UE and gNB) to improve data throughput and reliability based on spatial multiplexing and beamforming.

The multiple antennas at the transmitter can adopt the cyclic shift port virtualization to enhance sensing performance on one hand. However, it causes poor performance for communication in the other hand. Details of the solutions to the aforementioned problem can be understood by referring to the embodiments of the present disclosure as follows.

Figure 1:
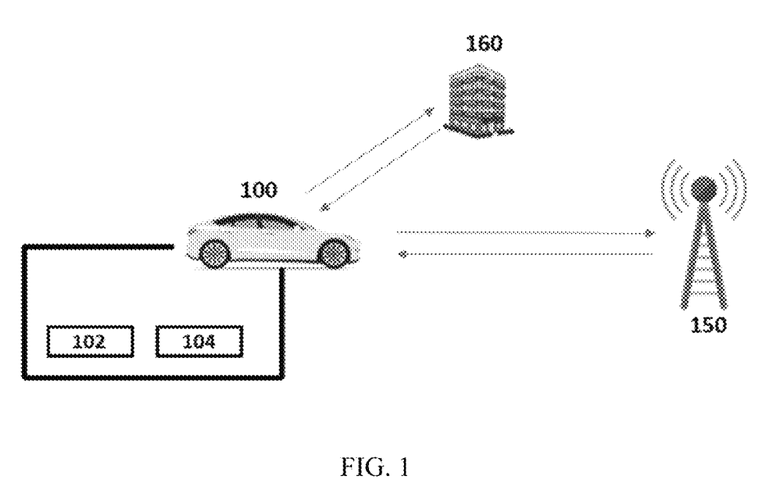
FIG. 1 illustrates an integrated sensing and communication (ISAC) node in accordance with a first embodiment of the present disclosure.

Now refer to FIG. 1 which illustrates an integrated sensing and communication (ISAC) node (100) in accordance with a first embodiment of the present disclosure. The ISAC node (100) comprises an ISAC transmitter (102) having M transmitting antenna(s) for transmitting radio frequency (RF) signals carrying data to a communication receiver (150); a radar receiver (104) having L receiving antenna(s) for receiving at least one reflected radio frequency (RF) signal reflected by a target obstacle (160). The ISAC node (100) then obtains a sensing result based on the reflected radio frequency (RF) signals reflected by a target obstacle (160). The M and L are integers. In addition, the ISAC node (100) in accordance with a first embodiment of the present disclosure is in a monostatic sensing system.

The RF signals transmitted by the M transmitting antenna(s) are applied with cyclic shift diversity and contain precoders which are selected by aligning a range of communication direction linked to a communication channel between the ISAC node (100) and the communication receiver (150) with minimal capacity loss.

In addition, the cyclic shift diversity above means that the radio frequency (RF) signals transmitted by the M transmitting antenna(s) are cyclic shifted in time domain.

In addition, a virtual receiving array is generated by the M transmitting antenna(s) of the ISAC transmitter (102) and the N receiving antenna(s) of the radar receiver (104).

In addition, the radio frequency (RF) signals transmitted by the M transmitting antenna(s) of the ISAC transmitter (102) are orthogonal frequency domain multiplexing (OFDM) signals, which form virtually orthogonal transmitter ports that are distinguishable at each of the N receiving antenna(s) of the radar receiver (104). The ISAC transmitter (102), the radar receiver (104) and the communication receiver (150) share information of the virtually orthogonal transmitter ports.

For a given direction of targeted communication receiver (150), the precoder with minimal capacity loss is obtained if and only if the value of angular-frequency flatness reaches 1. Therefore, the precoders in accordance with the first embodiment of the present disclosure are selected to cause a frequency-domain flatness at an Angle of Departure (AoD), which is the ratio of a minimum value to the maximum value of the communication channel frequency domain response per resource element at the range of communication direction, to be close to 1.

In one example, the precoders are selected by aligning a range of communication direction linked to the communication channel between the ISAC node (100) and the communication receiver (150) with minimal capacity loss based on a sounding result, which is determined based on a reference signal sent by the communication receiver (150). The reference signal is, for example, an uplink reference signal. The uplink reference is, for example, a Sounding Reference Signal (SRS) or a Demodulation Reference Signal (DMRS).

In another example, the precoders are selected by aligning a range of communication direction linked to the communication channel between the ISAC node (100) and the communication receiver (150) with minimal capacity loss based on a transmit precoder matrix indicator (TPMI) index sent by the communication receiver (150) and received by the ISAC node (100). The cyclic shift diversity and the precoders are selected to generate one or more mainlobe(s) of an Angle of Departure (AoD) whose direction(s) aligns with that corresponding to the minimum capacity loss at the communication receiver.

The technical means of the first embodiment of the present disclosure is introduced as above. Then, the technical effect will be further introduced as follows. Firstly, a communication channel model between the ISAC node (100) and communication receiver (150) is established as follows.

Assume the M transmitting antennas of the ISAC transmitter (102) are deployed into a uniformly linear transmitting array with 0.5-wavelength inter-element spacing at the ISAC node (100) and there are N active scatterers between the ICAS node (100) and communication receiver (150). Denote $\gamma_n$ as the complex gain of the nth scattering path, $\partial_n$ as the corresponding Angle of Departure (AoD). Then, transmitted baseband Cyclic Prefix Orthogonal Frequency Division Multiplexing (CP-OFDM) signal at the $m_t$th transmitting antenna in the qth symbol is given as follows.

$$s_{m_t}^q(t) = \sum_k w_{m_t}(k)s^q(k)\exp(j2\pi(k-1)\Delta ft)\xi(t-(q-1)T_s),$$

$$t \in [(q-1)T_s - T_{cp}, (q-1)T_s + T]$$

$$\xi(t) = \begin{cases} 1, & t \in [-T_{cp}, T] \\ 0, & \text{otherwise} \end{cases}$$

where $s^q$ (k) is the data to be transmitted on the kth subcarrier in the qth symbol and $w_{m_t}$(k) is the cyclic shift cover code used for generating data fed to different transmitting antennas. There are K orthogonal subcarriers in each symbol and Q symbols are considered as well. The subcarrier spacing is $\Delta f=1/T$. The duration of each symbol is $T_s=T+T_{cp}$, $T_{cp}$ is the length of cyclic prefix.

The RF signals in accordance with the first embodiment of the present application are applied with cyclic shift diversity, that is, a cyclic-shift-based transmitter port virtualization technique is utilized to construct cover codes that enable large virtual arrays for MIMO operations.

Let $I=[I_1, I_2, \ldots, I_M]$ be a cyclic shift index that is a permutation of a set $\{0, \ldots, M-1\}$, and $\varphi_{m_t}$ being a nominal phase at the $m_t$ transmitting antenna. Applying a phase rotation in the frequency domain is equivalent to implementing a cyclic shift in the time domain. Then, the cyclic shift cover codes used for generating data fed to different transmitters are as follows.

$$w_{m_t}(k) = e^{jI_{m_t}2\pi\frac{k-1}{M}+j\phi_{m_t}}$$

For each receiving antenna of the communication receiver (150), the AoD channel at the kth subcarrier of the qth symbol index is as follows.

$$H^q(k) = \sum_n \gamma_n \sum_{m_t=1}^{M} e^{j\pi(m_t-1)\sin\partial_n} w_{m_t}(k) = \sum_n H_{\partial_n}(k)$$

$$H_\vartheta(k) = \sum_{m_t=1}^{M} e^{j\pi(m-1)\sin\vartheta} w_{m_t}(k)$$

where $H_\Theta(k)$ is the AoD spatial pattern, which is a periodic function with period M.

The nominal phase $\phi_{m_t}$ at the $m_t$ transmitting antenna can be defined as precoders $\phi$. The precoders are determined by aligning the communication direction linked to the minimal capacity loss with the targeted communication direction. That is, the RF signals in accordance with the first embodiment of the present application further contain the precoders which are selected by aligning a communication direction linked to a communication channel between the ISAC node (100) and the communication receiver (200) with minimal capacity loss to improve communication performance.

Given the channel response of the communication channel is $\{H_\Theta(k)\}_{k=1}^M$ and the signal-to-noise ratio (SNR) value is $\kappa$, the maximum rate of reliable communication is as follows.

$$\mathcal{R}_\vartheta = \sum_{k=1}^{M} \log(1 + |H_\vartheta(k)|^2 \kappa) \leq M\log(1 + M\kappa)$$

The equality holds if and only if $|H_7(1)| = \ldots = |H_\Theta(M)| = \sqrt{M}$, which means the ISAC transmitter (102) of the ISAC node (100) transmits unified OFDM signals to simultaneously estimate the parameters of potential target (160).

For a given direction of targeted communication receiver (150), the precoder with minimal capacity loss is theoretically obtained if and only if the angular-frequency flatness $$\frac{\min_n |H_\vartheta(k)|}{\max_n |H_\vartheta(k)|}$$

of the communication channel reaches 1.

For example, assume the number of the transmitting antennas of the ISAC transmitter (102) is 4 (i.e. M=4) and assume the communication receiver (150) adopts a transmit precoder matrix indicator (TPMI) index, which is 12 and will be fed back to the ISAC node (100) through a feedback signal sent by the communication receiver (150). It is known that the mainlobe of the TPMI=12 is positioned at θ=0. The cyclic shift index I is set to {0 2 1 3}. The precoders $\phi$ are selected by solving the one of the following two optimization problems via genetic algorithm.

Cyclic-shift 1: $\max_\phi C(\theta = 0)$,

Cyclic-shift 2: $\max_\phi \sum_{\theta \in [-7°, -6°, \ldots, 6°, +7°]} C(\theta)$, where C(θ) is mutual information or Shannon Capacity of the communication channel between the ISAC node (100) and the communication receiver (150).

By simulation, the $|H_\Theta(k)|$, the Shannon Capacity loss, the mutual information loss for QPSK and the mutual information loss for 16QAM, the angular-frequency domain flatness with Cyclic-shift 1 above are shown as FIG. 2(a), FIG. 2(b), FIG. 2(c), FIGS. 2(d) and 2(e), respectively.

Figure 2A:
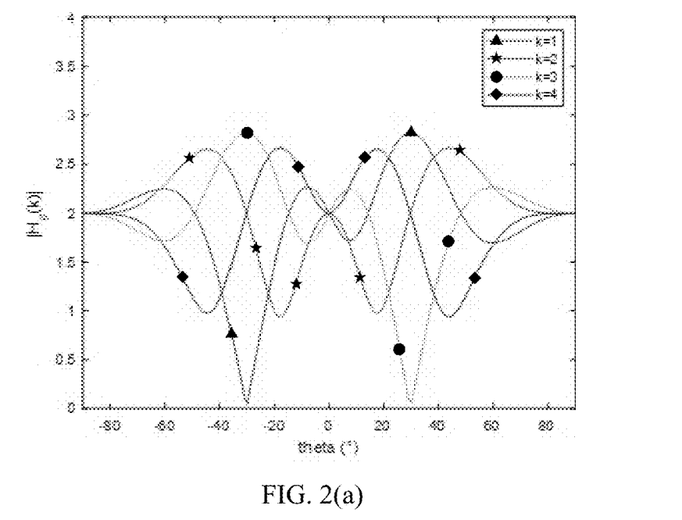
FIG. 2(a) illustrates the $|H_3(k)|$ of the communication channel with Cyclic-shift 1 in accordance with a first embodiment of the present disclosure.
Figure 2B:
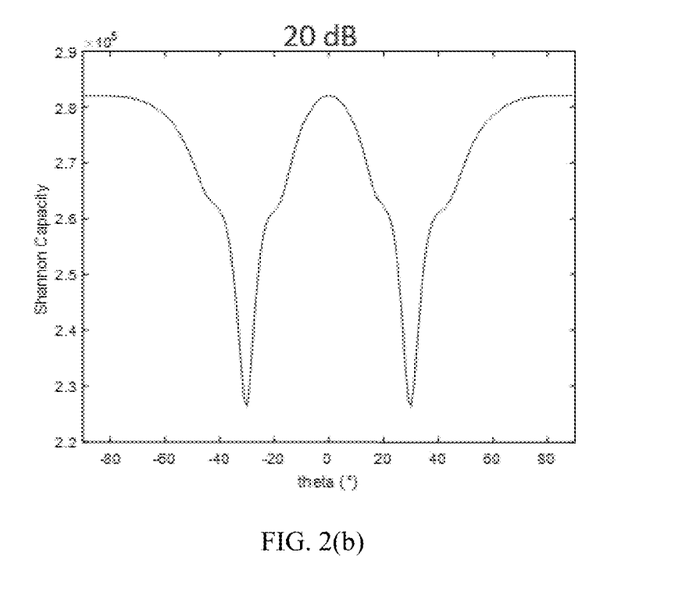
FIG. 2(b) illustrates the Shannon Capacity loss the communication channel with Cyclic-shift 1 in accordance with the first embodiment of the present disclosure.
Figure 2C:
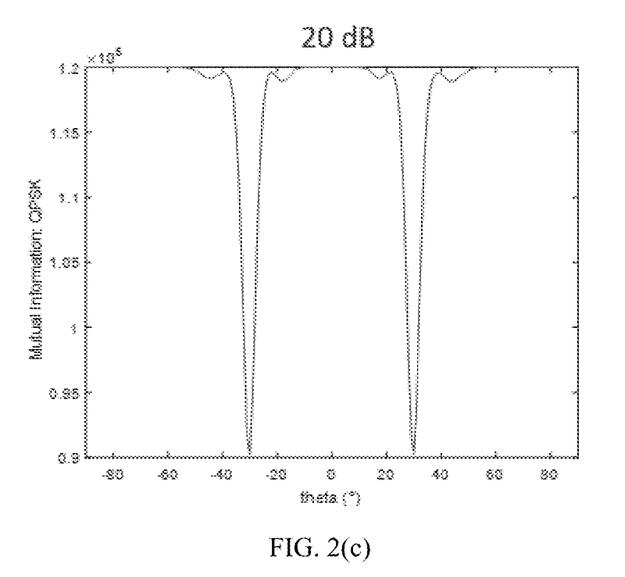
FIG. 2(c) illustrates the mutual information loss for QPSK with Cyclic-shift 1 in accordance with the first embodiment of the present disclosure.
Figure 2D:
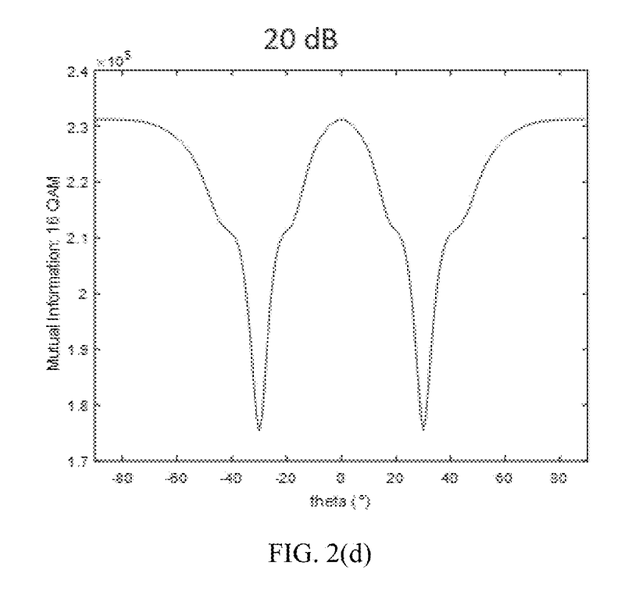
FIG. 2(d) illustrates the mutual information loss for 16QAM with Cyclic-shift 1 in accordance with the first embodiment of the present disclosure.
Figure 2E:
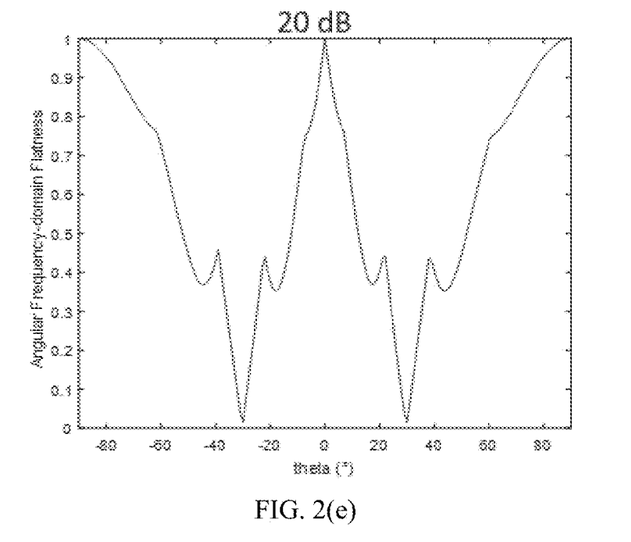
FIG. 2(e) illustrates the angular-frequency domain flatness with Cyclic-shift 1 in accordance with the first embodiment of the present disclosure.
Figure 2F:
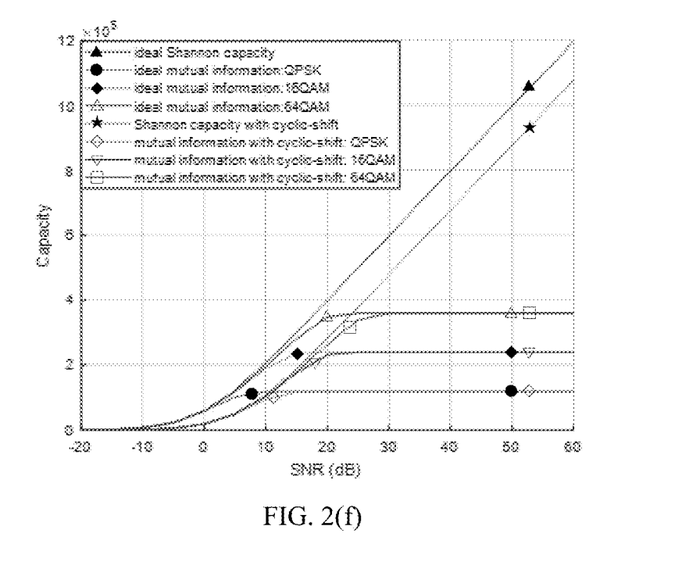
FIG. 2(f) illustrates the ideal capacity for comparison.

In addition, the ideal Shannon Capacity, the ideal mutual information loss for QPSK and the ideal mutual information loss for 16QAM are shown in FIG. 2(f) for comparison.

By simulation, the $|H_\Theta(k)|$, the Shannon Capacity loss, the mutual information loss for QPSK and the mutual information loss for 16QAM, the angular-frequency domain flatness with Cyclic-shift 2 above are shown as FIG. 3(a), FIG. 3(b), FIG. 3(c), FIGS. 3(d) and 3(e), respectively.

Figure 3A:
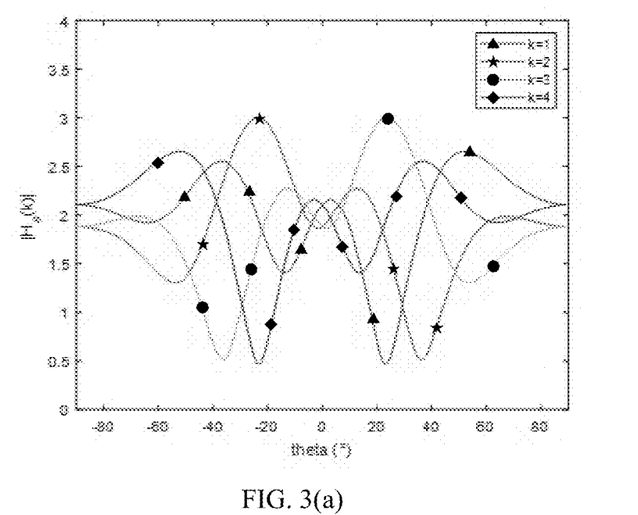
FIG. 3(a) illustrates the $|H_3(k)|$ of the communication channel with Cyclic-shift 2 in accordance with a first embodiment of the present disclosure.
Figure 3B:
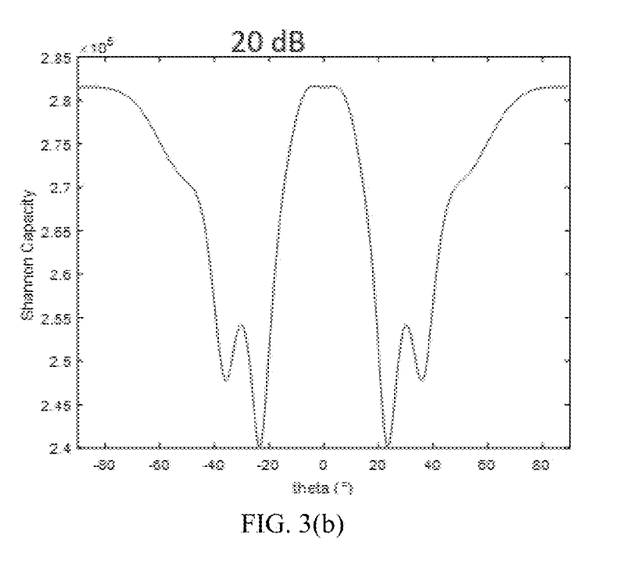
FIG. 3(b) illustrates the Shannon Capacity loss the communication channel with Cyclic-shift 2 in accordance with the first embodiment of the present disclosure.
Figure 3C:
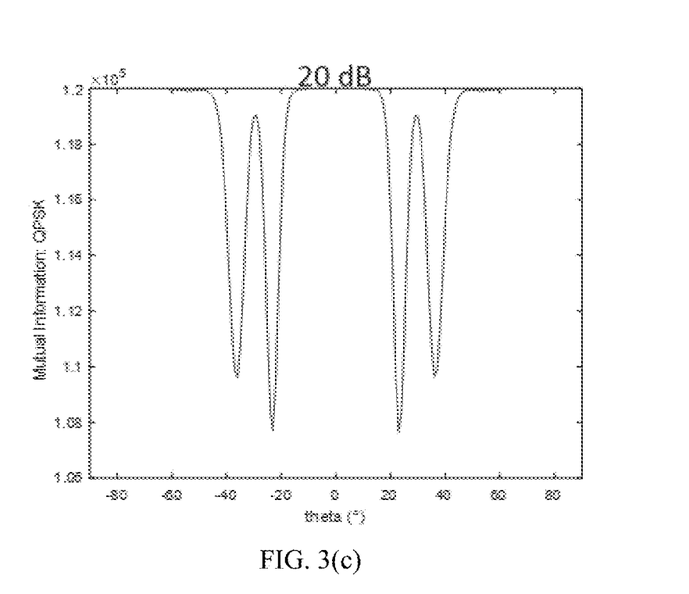
FIG. 3(c) illustrates the mutual information loss for QPSK with Cyclic-shift 2 in accordance with the first embodiment of the present disclosure.
Figure 3D:
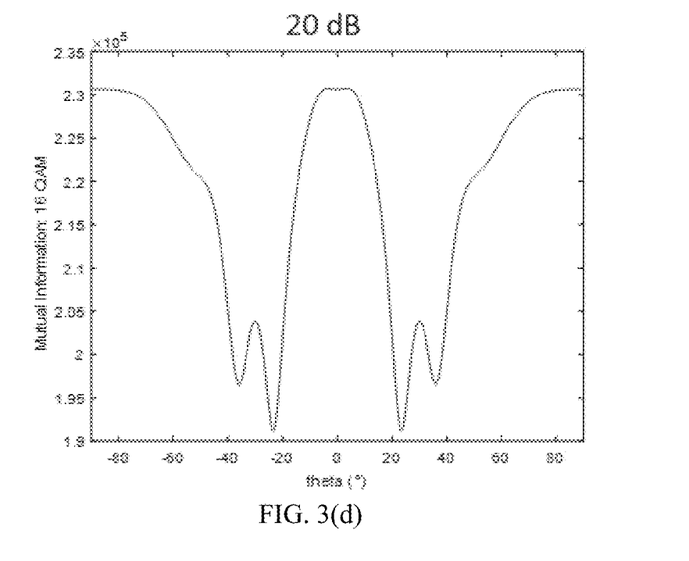
FIG. 3(d) illustrates the mutual information loss for 16QAM with Cyclic-shift 2 in accordance with the first embodiment of the present disclosure.
Figure 3E:
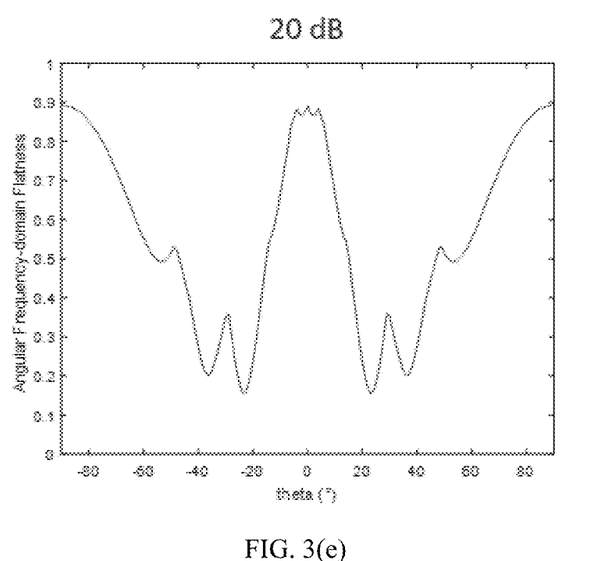
FIG. 3(e) illustrates the angular-frequency domain flatness with Cyclic-shift 2 in accordance with the first embodiment of the present disclosure.
Figure 3F:
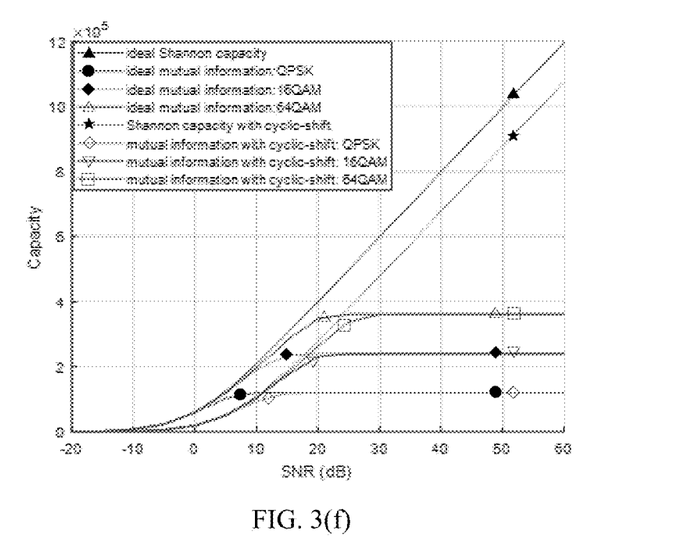
FIG. 3(f) illustrates the ideal capacity for comparison.

In addition, the ideal Shannon Capacity, the ideal mutual information loss for QPSK and the ideal mutual information loss for 16QAM are shown in FIG. 3(f) for comparison.

Please note that Cyclic-shift 1 focuses on the communication direction at θ=0° linked to the communication channel between the ISAC node (100) and the communication receiver (150) with minimal mutual information or Shannon Capacity. Cyclic-shift 2 focuses on the communication direction at θ=−7° to 7° linked to the communication channel between the ISAC node (100) and the communication receiver (150) with minimal sum of mutual information or Shannon Capacity of −7°, −6°, −5°, −4°, −3°, −2°, −1°, 0°, 1°, 2°, 3°, 4°, 5°, 6° and 7°.

The simulation result obtained from minimizing the Shannon capacity loss aligns with that achieved by minimizing the mutual information loss, as well as that resulted from maximizing the angular frequency flatness, which means, in the direction of targeted communication receiver (150), the minimized capacity loss induced by cyclic shift port virtualization is about 6 dB with the selected precoders. The 6 dB gap is inevitable since transmit diversity is known to lose SNR to beamforming by the number of antenna elements. Accordingly, for a given direction of targeted communication receiver, the proposed precoder scheme already achieves the theoretical optimum for the communication performance.

Figure 4:
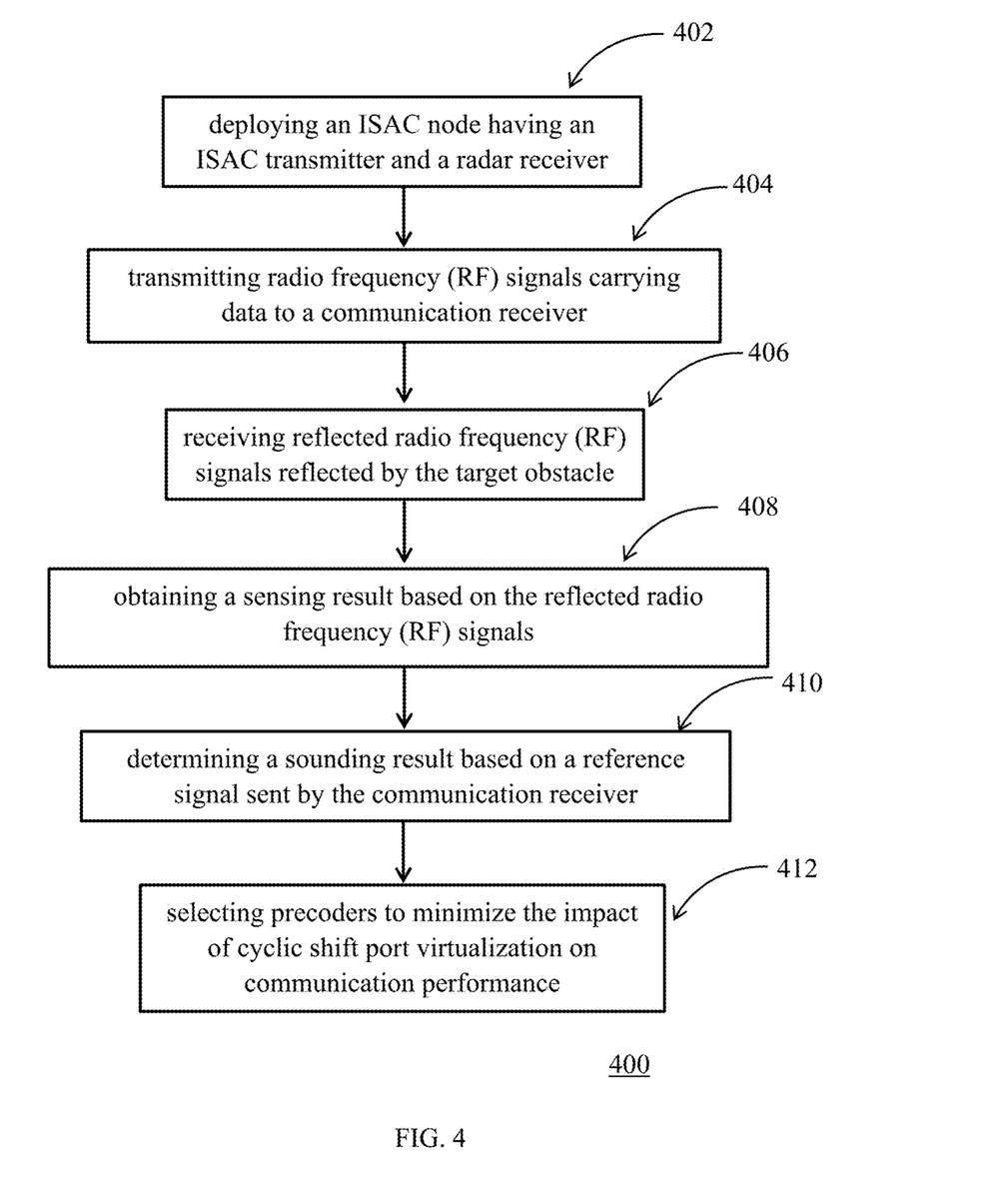
FIG. 4 illustrates a method of joint communication and sensing of a target obstacle in accordance with a second embodiment of the present disclosure.

Now refer to FIG. 4 which illustrates a method (400) of joint communication and sensing of a target obstacle in accordance with a second embodiment of the present disclosure.

The method (400) comprises deploying an integrated sensing and communication (ISAC) node (step 402). The ISAC node deploys an ISAC transmitter having M transmitting antenna(s) and a radar receiver having L receiving antenna(s), wherein the M and L are integers.

The method (400) further comprises transmitting radio frequency (RF) signals carrying data to a communication receiver by the M transmitting antenna(s) of the ISAC transmitter (step 404). The RF signals transmitted by the M transmitting antenna(s) of the ISAC transmitter are applied with cyclic shift diversity, which means the radio frequency (RF) signals transmitted by the M transmitting antenna(s) of the ISAC transmitter be cyclic shifted in time domain.

The method (400) further comprises receiving radio frequency (RF) signals reflected by the target obstacle by the L receiving antenna(s) (step 406).

The method (400) further comprises obtaining a sensing result based on the reflected radio frequency (RF) signals (step 408).

The method (400) further comprises determining a sounding result based on a reference signal sent by the communication receiver (step 410).

The method (400) further comprises selecting precoders to minimize the impact of cyclic shift port virtualization on communication performance (step 412).

In the step 404, The RF signals transmitted by the M transmitting antenna(s) of the ISAC transmitter further contain precoders which are selected by aligning a range of communication direction linked to a communication channel between the ISAC node and the communication receiver with minimal capacity loss based on the sounding result.

In addition, a virtual receiving array is generated by the M transmitting antenna(s) and the L receiving antenna(s). The virtual receiving array is used to enable the estimation of 3D position parameters and velocities of potential target obstacle.

In the step 404, the radio frequency (RF) signals transmitted by the M transmitting antenna(s) of the ISAC transmitter are orthogonal frequency domain multiplexing (OFDM) signals which form virtually orthogonal transmitter ports that are distinguishable at each of the L receiving antenna(s). The ISAC transmitter, the radar receiver and the communication receiver share information of the virtually orthogonal transmitter ports.

In the step 410, the precoders above are selected to cause a frequency-domain flatness at an Angle of Departure (AoD) to be close to 1, by which, the communication performance may achieve the theoretical optimum for the communication between the ISAC node and the communication receiver for a given direction of targeted communication receiver. The frequency-domain flatness at an Angle of Departure (AoD) above is defined by the ratio of a minimum value to the maximum value of the communication channel at the range of communication direction.

Figure 5:
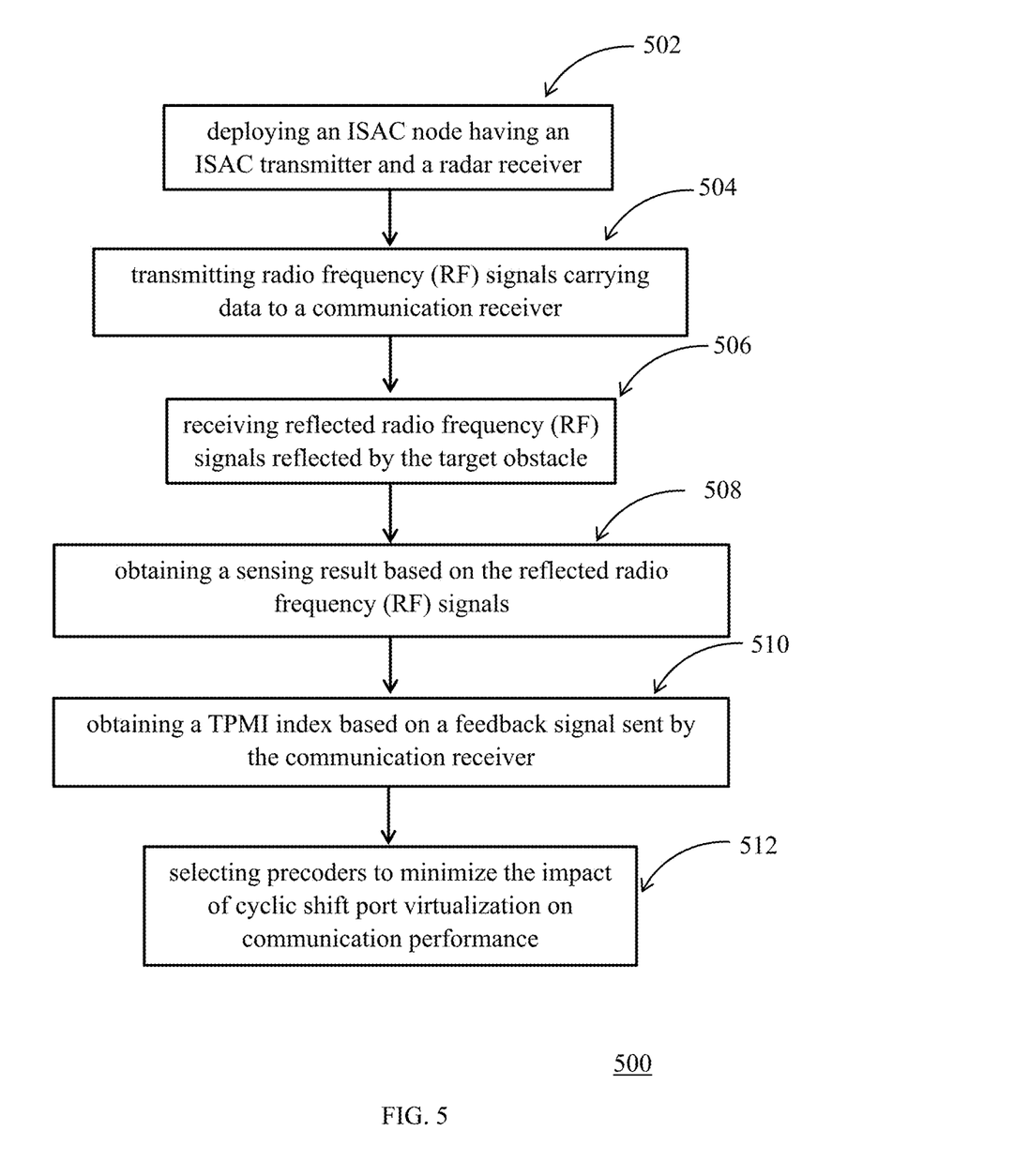
FIG. 5 illustrates a method of joint communication and sensing of a target obstacle in accordance with a third embodiment of the present disclosure.

Now refer to FIG. 5 which illustrates a method of joint communication and sensing of a target obstacle (500) in accordance with a third embodiment of the present disclosure.

The method (500) comprises deploying an ISAC node (step 502). The ISAC node comprises an ISAC transmitter having M transmitting antenna(s) and a radar receiver having L receiving antenna(s), wherein the M and L are integers.

The method (500) further comprises transmitting radio frequency (RF) signals carrying data to a communication receiver by the M transmitting antenna(s) of the ISAC transmitter (step 504). The RF signals transmitted by the M transmitting antenna(s) of the ISAC transmitter are applied with cyclic shift diversity, which means the radio frequency (RF) signals transmitted by the M transmitting antenna(s) of the ISAC transmitter be cyclic shifted in time domain.

The method (500) further comprises receiving radio frequency (RF) signals reflected by the target obstacle by the L receiving antenna(s) (step 506).

The method (500) further comprises obtaining a sensing result based on the reflected radio frequency (RF) signals (step 508).

The method (500) further comprises obtaining a transmit precoder matrix indicator (TPMI) index based on a feedback signal sent by the communication receiver (step 510).

The method (500) further comprises selecting precoders to minimize the impact of cyclic shift port virtualization on communication performance (step 512).

In the step 512, the RF signals transmitted by the transmitting antenna(s) of the ISAC transmitter contain precoders which are selected by aligning one or more communication direction(s) linked to a communication channel between the ISAC node and the communication receiver with minimal frequency selectivity based on the TPMI index.

Specifically, the precoders are selected to generate one or more mainlobe(s) of an Angle of Departure (AoD) whose direction(s) aligns with that corresponding to the minimum capacity loss at the communication receiver toward the communication receiver.

In the step 504, the radio frequency (RF) signals transmitted by the M transmitting antenna(s) of the ISAC transmitter are orthogonal frequency domain multiplexing (OFDM) signals.

The preferred embodiments of the present invention have been described above. However, those having ordinary skill in the art readily recognize that the disclosure described above can be utilized in a variety of devices, environments, and situations. Although the present invention is written with respect to specific embodiments and implementations, various changes and modifications may be suggested to a person having ordinary skill in the art. It is intended that the present disclosure encompass such changes and modifications that fall within the scope of the appended claims.

For example, those having ordinary skill in the art would understand that a device, such as a UE (such as a vehicle or a smartphone) and a gNB, may equip the aforementioned ISAC node and further include a processor, memory in electronic communication with the processor, and instructions stored in the memory. The instructions are used to perform the methods in accordance with the embodiments above. The ISAC node may comprise an ISAC transmitter having M transmitting antenna(s) for transmitting radio frequency (RF) signals carrying data to a communication receiver; and a radar receiver having L receiving antenna(s) for receiving radio frequency (RF) signals reflected by a target obstacle; wherein the M and L are integers; and wherein the ISAC node estimates a channel condition of a communication channel between the ISAC node and the communication receiver; and wherein the RF signals transmitted by the M transmitting antenna(s) are applied with cyclic shift diversity and contain precoders which are selected by aligning a range of communication direction linked to the communication channel between the ISAC node and the communication receiver with minimal capacity loss based on the estimated channel condition. For the ISAC node, the direction of communication receiver is told by a feedback signal containing TPMI index or learned by the ISAC via a sounding reference signal, such as a sounding reference signal (SRS) or a demodulation reference signal (DMRS) sent by the communication receiver.

In addition, the range of communication direction linked to the communication channel between the ISAC node and the communication receiver with minimal mutual information or Shannon Capacity is not limited to the specific degrees, such as at 0° (one point) or at −7° to 7° (several points) in the aforementioned examples.

What is claimed is:

1. A method of joint communication and sensing of a target obstacle, comprising:
   deploying an integrated sensing and communication (ISAC) node, comprising an ISAC transmitter having M transmitting antenna(s) and a radar receiver having L receiving antenna(s), wherein the M and L are integers;
   transmitting radio frequency (RF) signals carrying data to a communication receiver by the M transmitting antenna(s) of the ISAC transmitter;
   receiving radio frequency (RF) signals reflected by the target obstacle by the L receiving antenna(s);
   obtaining a sensing result based on the reflected radio frequency (RF) signals; and
   determining a sounding result based on a reference signal sent by the communication receiver;
   wherein the RF signals transmitted by the M transmitting antenna(s) of the ISAC transmitter are applied with cyclic shift diversity; and wherein the RF signals transmitted by the M transmitting antenna(s) of the ISAC transmitter contain precoders which are selected by aligning a range of communication direction linked to a communication channel between the ISAC node and the communication receiver with minimal capacity loss based on the sounding result.

2. The method of claim 1, wherein the radio frequency (RF) signals transmitted by the M transmitting antenna(s) of the ISAC transmitter are cyclic shifted in time domain.

3. The method of claim 1, wherein a virtual receiving array is generated by the M transmitting antenna(s) and the L receiving antenna(s).

4. The method of claim 1, wherein the radio frequency (RF) signals transmitted by the M transmitting antenna(s) of the ISAC transmitter are orthogonal frequency domain multiplexing (OFDM) signals.

5. The method of claim 4, wherein the radio frequency (RF) signals transmitted by the M transmitting antenna(s) of the ISAC transmitter form virtually orthogonal transmitter ports that are distinguishable at each of the L receiving antenna(s).

6. The method of claim 1, wherein the reference signal is an uplink reference signal.

7. The method of claim 6, wherein the uplink reference signal is a sounding reference signal (SRS) or a demodulation reference signal (DMRS).

8. The method of claim 1, wherein the precoders are selected to cause a frequency-domain flatness at an Angle of Departure (AoD), which is the ratio of a minimum value to the maximum value of the communication channel frequency domain response per resource element at the range of communication direction, to be close to 1.

9. A method of joint communication and sensing of a target obstacle, comprising:
  deploying an integrated sensing and communication (ISAC) node, comprising an ISAC transmitter having M transmitting antenna(s) and a radar receiver having L receiving antenna(s), wherein the M and L are integers;
  transmitting radio frequency (RF) signals carrying data to a communication receiver by the M transmitting antenna(s) of the ISAC transmitter;
  receiving radio frequency (RF) signals reflected by the target obstacle by the L receiving antenna(s);
  obtaining a sensing result based on the reflected radio frequency (RF) signals; and
  obtaining a transmit precoder matrix indicator (TPMI) index based on a feedback signal sent by the communication receiver;
  wherein the RF signals transmitted by the M transmitting antenna(s) of the ISAC transmitter are applied with cyclic shift diversity; and
  wherein the RF signals transmitted by the M transmitting antenna(s) of the ISAC transmitter contain precoders which are selected by aligning one or more communication direction(s) linked to a communication channel between the ISAC node and the communication receiver with minimal capacity loss based on the TPMI index.

10. The method of claim 9, wherein the radio frequency (RF) signals transmitted by the M transmitting antenna(s) of the ISAC transmitter are cyclic shifted in time domain.

11. The method of claim 10, wherein the precoders are selected to generate one or more mainlobe(s) of an Angle of Departure (AoD) whose direction(s) aligns with that corresponding to the minimum capacity loss at the communication receiver.

12. The method of claim 9, wherein the radio frequency (RF) signals are orthogonal frequency domain multiplexing (OFDM) signals.

13. An integrated sensing and communication (ISAC) node, comprising:
  an ISAC transmitter having M transmitting antenna(s) for transmitting radio frequency (RF) signals carrying data to a communication receiver; and
  a radar receiver having L receiving antenna(s) for receiving radio frequency (RF) signals reflected by a target obstacle;
  wherein the M and L are integers; and
  wherein the ISAC node estimates a channel condition of a communication channel between the ISAC node and the communication receiver; and
  wherein the RF signals transmitted by the M transmitting antenna(s) are applied with cyclic shift diversity and contain precoders which are selected by aligning a range of communication direction linked to the communication channel between the ISAC node and the communication receiver with minimal capacity loss based on the estimated channel condition.

14. The ISAC node of claim 13, wherein the radio frequency (RF) signals are cyclic shifted in time domain.

15. The ISAC node of claim 13, wherein a virtual receiving array is generated by the M transmitting antenna(s) and the N receiving antenna(s).

16. The ISAC node of claim 13, wherein the radio frequency (RF) signals transmitted by the M transmitting antenna(s) are orthogonal frequency domain multiplexing (OFDM) signals.

17. The ISAC node of claim 16, wherein the radio frequency (RF) signals transmitted by the M transmitting antenna(s) form virtually orthogonal transmitter ports that are distinguishable at each of the N receiving antenna(s).

18. The ISAC node of claim 13, wherein the channel condition of the communication channel between the ISAC node and the communication receiver is estimated based on a sounding reference signal (SRS) or a demodulation reference signal (DMRS) sent by the communication receiver.

19. The ISAC node of claim 13, wherein the channel condition of the communication channel between the ISAC node and the communication receiver is estimated based on a feedback signal containing a TPMI index sent by the communication receiver.

20. The ISAC node of claim 13, wherein the precoders are selected to cause a frequency-domain flatness at an Angle of Departure (AoD), which is the ratio of a minimum value to the maximum value of the communication channel frequency domain response per resource element at the range of communication direction, to be close to 1.

* * * * *